Feb. 14, 1933. F. D. GRUND 1,897,698
SPINDLE SECURING MEANS FOR DOORLATCHES
Original Filed Aug. 28, 1930
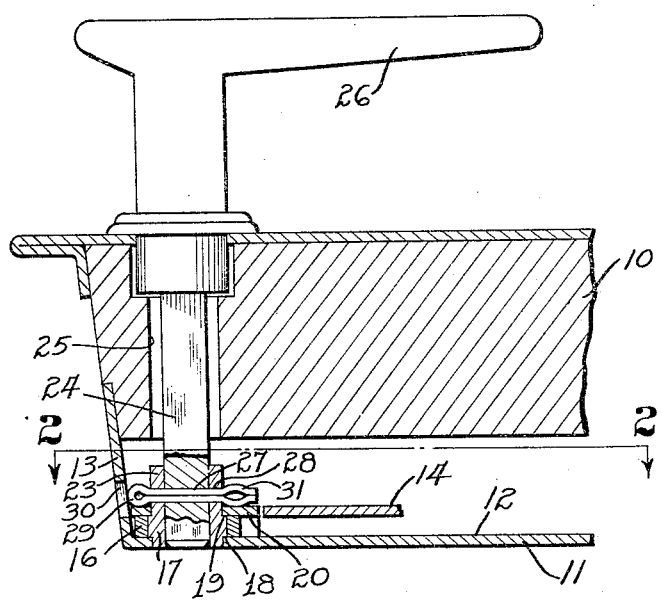
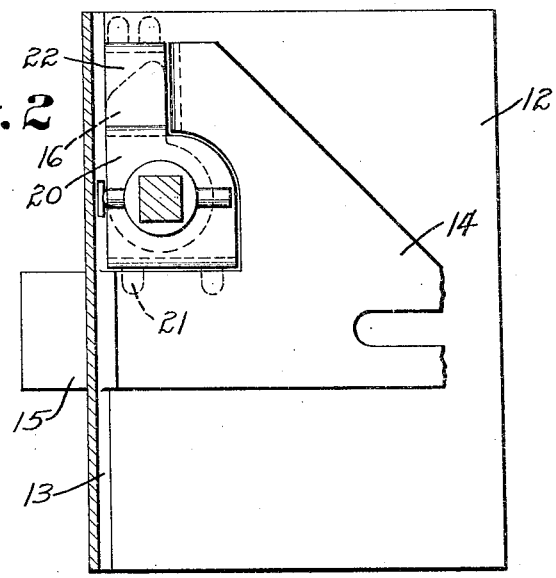
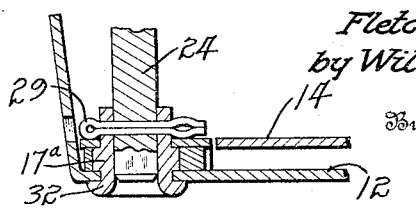
Inventor
Fletcher D. Grund, deceased
by William E. Singer, Administrator
By Owen + Owen
Attorneys Patented Feb. 14, 1933

1,897,698

UNITED STATES PATENT OFFICE

FLETCHER D. GRUND, DECEASED, LATE OF WESTON, OHIO, BY WILLIAM E. SINGER, ADMINISTRATOR, OF WESTON, OHIO; SAID GRUND ASSIGNOR TO THE AMERICAN SWISS COMPANY, OF TOLEDO, OHIO, A CORPORATION OF OHIO

SPINDLE SECURING MEANS FOR DOORLATCHES

Original application filed August 28, 1930, Serial No. 478,369. Divided and this application filed September 14, 1931. Serial No. 562,646.

This invention relates to door latches, particularly adapted for use on doors of automobiles or similar vehicles, but more particularly to devices for detachably connecting the operating spindle to the door latch unit.

An object of the invention is to produce a simple and efficient means for detachably connecting the operating spindle to the door latch unit so that the spindle is securely held in place, but which may be readily disconnected from the unit without great difficulty.

Other objects and advantages of the invention will hereinafter appear, and, for purposes of illustration, but not of limitation, embodiments of the invention are shown on the accompanying drawing, in which:

Figure 1 is a transverse sectional view of a portion of a door showing the means for detachably connecting the operating spindle to the door latch unit;

Figure 2 is a transverse sectional view on the line 2—2 of Fig. 1; and

Figure 3 is a sectional view of an alternate form in which the roll back is flanged over the outside of the back plate for securing it in position.

This application constitutes a division of the co-pending application Serial No. 478,369, filed August 28th, 1930.

Referring to the drawing, 10 indicates the door of an automobile to which a door latch unit 11 is secured, the latter having a back plate 12 provided with a flanged face 13 secured by screws or other suitable means to the door. Only so much of a door latch is shown to enable the invention to be understood clearly, and, as shown, a latch bolt 14 having a latch head 15, which projects through the flanged plate 13, is adapted to be retracted from the outside of the door by a roll back 16. The roll back has an opening to receive a hub 17. The hub 17 is provided with shoulders 18 and 19, which engage respectively the inner side of the back plate 12 and a bearing plate 20 spaced outwardly from the back plate. The bearing plate 20 is provided with tabs 21, which extend through openings in the back plate, and are bent over in order to securely retain the bearing plate to the back plate. As shown, the bearing plate 20 has an extension 22, which extends over the roll back 16. It will be seen that the back plate 12 is apertured to receive the outer end of and provide a bearing for the hub 17.

It will be seen that the hub 17 is securely retained against movement in opposite directions by the shoulders 18 and 19, and that the back plate and bearing plate 20 provide bearings for the hub. Integral with the hub 17 and extending outwardly therefrom beyond the bearing plate 20 is a substantially tubular extension 23, which is provided with a squared opening to receive a similar shaped shank of an operating spindle 24, which, as shown, extends through to the hub 17. The spindle 24 extends through an opening 25 provided in the door 10, and an operating handle 26 is suitably secured to the outer end of the spindle to facilitate the turning movements thereof.

To retain the spindle 24 and hub 17 in assembled relation, transverse openings 27 and 28 are formed respectively on the spindle and hub extension 23. When these openings are in register a cotter pin 29 may be inserted through an opening 30 in the flange plate 13. The outer end of the cotter pin 29 is provided with bowed portions 31 so that the cotter pin may be forced in through the opening 30, and after being inserted a sufficient distance the bowed portions 31 automatically spring outwardly and securely retain the pin in place.

It will be apparent that when the parts are assembled, as above described, any outward pull on the handle 26 will be transmitted through the cotter pin 29 to the hub extension 23, and through the shouldered portion 19 to the bearing plate 20, which in turn is secured to the back plate 11. Thus unwarranted or unlicensed withdrawal of the operating spindle 24 is prevented since the back plate 12 is ordinarily securely mounted on the door, and provides an unyielding barrier which would successfully militate against any attempt to pry off the handle 26 and spindle 24. From the standpoint of production the cotter pin 29 may be readily and easily forced home so that the work of connecting the spindle to the latch unit is materially simplified.

The form shown in Fig. 2 is similar to that above described except that the outer end of the hub 17ª is provided with a flange 32, which engages the outside of the back plate 12. This flange may be formed by spinning, or any other suitable means, and it will be apparent that when on outward pull is exerted on the spindle 24 it will be imparted through the hub 17ª to the back plate 12. This provides an exceedingly sturdy and reliable construction, and securely retains the roll back in the proper position with relation to the back plate.

It is to be understood that numerous changes in details of construction, arrangement and operation may be effected without departing from the spirit of the invention, especially as defined in the appended claims.

What is claimed as new and desired to be secured by Letters Patent is:

1. In combination, a back plate, a latch bolt movable over said back plate, a roll back for retracting said bolt, a hub for said roll back, a bearing plate spaced from said back plate and apertured to receive said hub, means securing the bearing plate to said back plate, shouldered portions on said hub engaging said back and bearing plates respectively, a substantially tubular extension rigid with said hub and extending outside of said bearing plate, said extension and spindle having transverse openings adapted to register with each other, a detachable retainer element extending through said registering openings and having portions thereof disposed on opposite sides of said spindle, and means integral with and forming a part of the retainer element for releasably holding same in position.

2. In combination, a back plate, a latch bolt movable over said back plate, a roll back for retracting said bolt, a hub for said roll back, a bearing plate spaced from said back plate and apertured to receive said hub, means securing the bearing plate to said back plate, shouldered portions on said hub engaging said back and bearing plates respectively, a substantialy tubular extension rigid with said hub and extending outside of said bearing plate, said extension and spindle having transverse openings adapted to register with each other, a cotter pin extending through said registering openings and having portions thereof disposed on opposite sides of said spindle, and outwardly bowed portions on said cotter pin for releasably holding same in position.

In testimony whereof I have hereunto signed my name to this specification.

WILLIAM E. SINGER,
*Administrator of the Estate of Fletcher D. Grund, Deceased.*